United States Patent
Patwardhan et al.

(10) Patent No.: US 12,279,323 B2
(45) Date of Patent: Apr. 15, 2025

(54) SPLIT MULTI-LINK SYSTEM

(71) Applicant: HEWLETT PACKARD ENTERPRISE DEVELOPMENT LP, Houston, TX (US)

(72) Inventors: Gaurav Patwardhan, Santa Clara, CA (US); Eldad Perahia, Park City, UT (US); Sachin Ganu, Santa Clara, CA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 380 days.

(21) Appl. No.: 17/839,040

(22) Filed: Jun. 13, 2022

(65) Prior Publication Data
US 2023/0403751 A1    Dec. 14, 2023

(51) Int. Cl.
  *H04W 76/15*    (2018.01)
  *H04W 48/16*    (2009.01)
  *H04W 80/02*    (2009.01)

(52) U.S. Cl.
  CPC ........... *H04W 76/15* (2018.02); *H04W 48/16* (2013.01); *H04W 80/02* (2013.01)

(58) Field of Classification Search
  CPC ..... H04W 76/15; H04W 48/16; H04W 80/02; H04W 74/0808
  See application file for complete search history.

(56) References Cited

U.S. PATENT DOCUMENTS

| | | | |
|---|---|---|---|
| 9,277,411 B2 | 3/2016 | Mody et al. | |
| 10,263,670 B2 | 4/2019 | Ashrafi | |
| 10,491,303 B2 | 11/2019 | Ashrafi | |
| 2020/0163141 A1 | 5/2020 | Hsu et al. | |
| 2020/0275517 A1 | 8/2020 | Ashrafi | |
| 2020/0359259 A1 | 11/2020 | Patil et al. | |
| 2020/0382198 A1 | 12/2020 | Ashrafi | |
| 2021/0144598 A1* | 5/2021 | Liu | H04W 36/06 |
| 2021/0212045 A1 | 7/2021 | Cherian et al. | |
| 2021/0212142 A1 | 7/2021 | Patil et al. | |
| 2021/0212156 A1* | 7/2021 | Kwon | H04W 76/34 |
| 2023/0379725 A1* | 11/2023 | Yang | H04B 7/06952 |

FOREIGN PATENT DOCUMENTS

WO    2020/076350 A1    4/2020

* cited by examiner

*Primary Examiner* — Gary Mu
*Assistant Examiner* — Mohammad Safwaan Alam
(74) *Attorney, Agent, or Firm* — Sheppard Mullin Richter & Hampton LLP

(57) ABSTRACT

Systems and methods are provided for defining a split multi-link system. For example, the split multi-link system can define a multi-link device (MLD), where the MLD operates a first radio from a first AP of a plurality of APs and a second radio from a second AP of the plurality of APs through a Media Access Control (MAC) Service Access Point (SAP) of the split multi-link system. The first radio from the first AP and the second radio from the second AP may operate at different frequencies. The split multi-link system may also affiliate the first radio from the first AP and the second radio from the second AP with the MLD, where, using the MLD, the split multi-link system can transmit or receive one or more data frames from the MLD to a non-MLD or MLD client device using the first radio or the second radio.

20 Claims, 9 Drawing Sheets

SPLIT MULTI-LINK SYSTEM

BACKGROUND

The IEEE 802.11 protocol denotes a set of interface standards developed by the IEEE 802.11 committee for short-range communications. For example, the devices that implement the IEEE 802.11 protocol may have both 2.4 GHz and 5 GHz radios for transmitting and receiving data and management frames between devices with similar radio configurations.

Using this or other standards, various access methods are available to enable network communications. One such method is a Carrier Sense Multiple Access (CSMA), where a network device can sense and transmit data to other network devices. For example, the transmitting network device may sense a channel and check whether the channel is idle or busy (e.g., using a wait for silence method). If the channel is busy, the transmitting network device may wait until the channel becomes idle. When the channel is not busy, the transmitting network device may immediately transmit data, control, or management frames using a persistent CSMA method, or transmit data, control, or management frames after a predetermined amount of time using a non-persistent CSMA method. These and other communication methods are available.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

Figure 1:
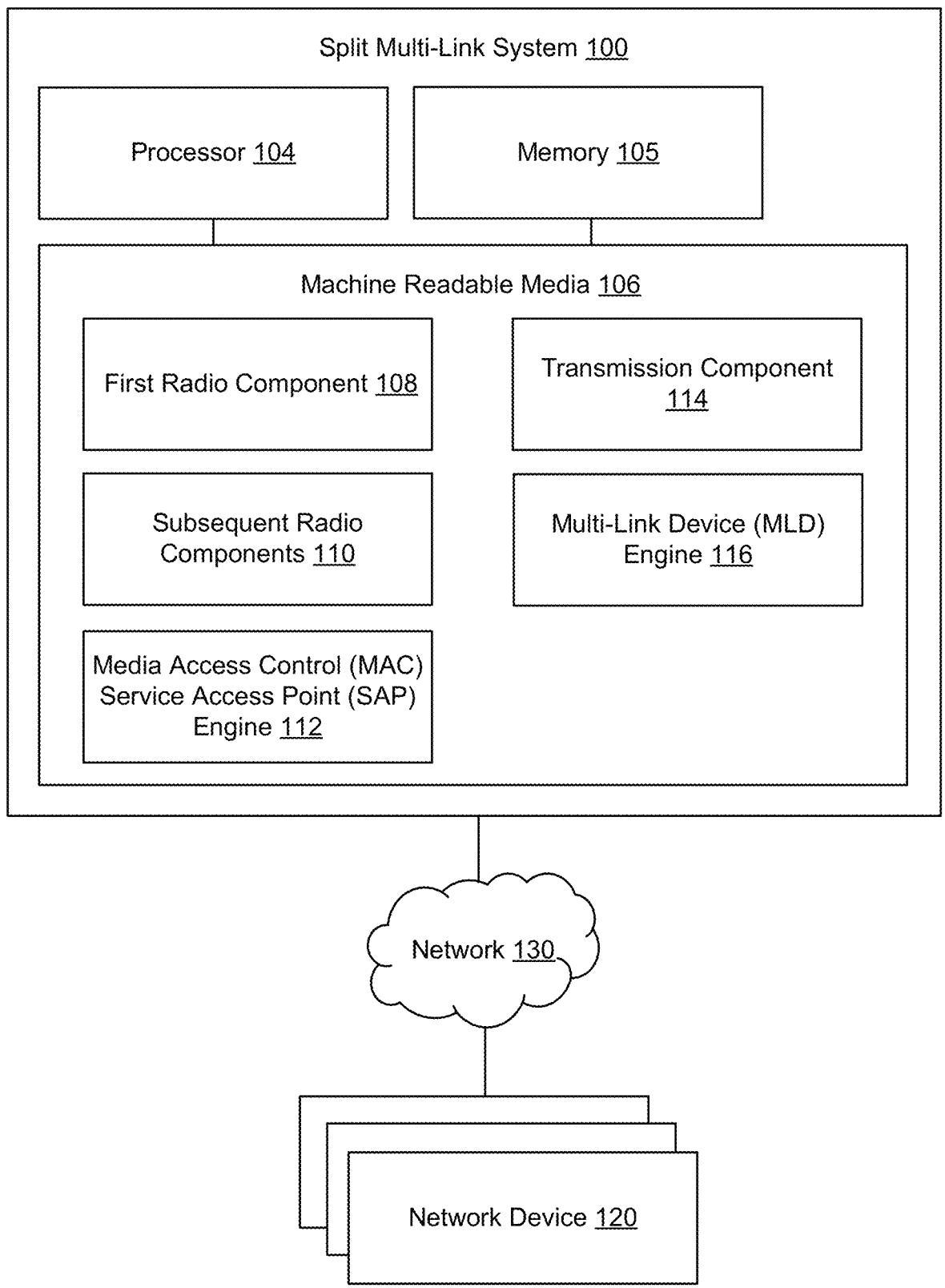
FIG. 1 illustrates a split multi-link system that defines an MLD in communication with one or more network devices via a network, in accordance with some examples of the disclosure.

The figures are not exhaustive and do not limit the present disclosure to the precise form disclosed.

DETAILED DESCRIPTION

Different physical layer and MAC layer enhancements were proposed to improve the standard protocol definition of the basic CSMA scheme, for example, in order to increase throughput, implement wider channel bandwidth, support other types of network devices, decrease power consumption while maintaining operability, or other technical enhancements. One such enhancement between two network devices is to increase the available communication channels from one channel to two channels using multi-link operations (MLO).

MLO is a particular feature of the IEEE 802.11be Extremely High Throughput (EHT) Wi-Fi 7 standard that allows network devices, like access points (APs) and client devices, the ability to transmit and receive data from the same traffic flow over multiple radio channels. For example, a first network device (e.g., the AP) may implement multiple radios, like a 2.4 GHz radio and 5 GHz radio, and each of these radios may communicate with a similar or overlapping frequency radios on a second network device (e.g., the client device). In some examples, the networking devices may comprise non-overlapping radios to offer additional frequency transmission options. For example, the plurality of APs may comprise a 2.4 GHz radio and a non-2.4 GHz radio (e.g., 5 GHz or 6 GHz), or a 5 GHz radio and a non-5 GHz radio (e.g., 2.4 GHz or 6 GHz), or a 6 GHz radio and a non-6 GHz radio (e.g., 2.4 GHz or 5 GHz). In another example, the plurality of APs may comprise a tri-radio option, including one or more APs with three radios, 2.4 GHz radio, 5 GHz radio, and 6 GHz radio.

MLO also allows a non-access point (AP) Multi-Link Device (non-AP MLD) to send data to or receive data from an MLD over multiple links. As such, all links of a multi-link entity that reside in a single hardware device can be used for MLO transmissions. For example, a first set of frames (e.g., data frames) may be transmitted from a first network device to a second network device on a first radio channel and a second set of frames (e.g., control frames) may be transmitted from the first network device to the second network device on a second radio channel.

These transmissions may correspond to particular protocol formatting. Various radio settings are available for both IEEE 802.11b/g (2.4 GHz) and IEEE 802.11a (5 GHz) implemented at each AP or other network device (used interchangeably). For example, the network device can operate in accordance with a default profile or create a new profile that corresponds with the rules subject to the protocol (e.g., IEEE 802.11a or 802.11g). The profiles may comprise a manual identification of a channel for each AP group, create separate IEEE 802.11a and IEEE 802.11g profiles for each network device group, or assign a different transmission channel for each profile. For example, one network device group could have an IEEE 802.11a profile that uses channel 36 and an IEEE 802.11g profile that uses channel 11, and another network device group could have an IEEE 802.11a profile that uses channel 40 and an IEEE 802.11g profile that uses channel 9.

In order to implement these communications, each network device may implement a Media Access Control (MAC) Service Access Point (SAP) or other interface controller component. The MAC SAP is an interface implemented as a physical or virtual component of a physical or virtual network device (e.g., an AP or other client device). Using the MAC SAP, devices or users can identify a particular user service that sends and receives a particular class of data. The data may be associated with a service request across multiple, different layers of the Open Systems Interconnection (OSI) model for the network device. As an example, the MAC layer (e.g., part of the second or data link layer that controls access to the physical transmission medium in local networks) can request services from the physical layer (e.g., part of the first layer that defines electrical and physical specifications for the device) in a single network device. The address for requesting services across the layers can use a Network Service Access Point (NSAP) address or an Asynchronous Transfer Mode (ATM) can use Transport (TSAP), Session (SSAP) or Presentation (PSAP) Service Access Points to specify a destination address for a connection. The SAP can differentiate at any of the OSI layers between multiple services at that layer provided by the network device.

The MAC SAPs may support dual-band parallel architectures aggregated across 2.4 GHz, 5 GHz, or 6 GHz bands using stored usage rules and particular management specifications for multiple bands. For example, the IEEE 802.11 protocol recommends two multi-band MAC architectures to provide different technical support for multi-band operations, allowing for various management/data plane renegotiations for faster session transfer over multiple bands and/or channels concurrently or non-concurrently.

However, traditional MAC SAPs are interfaces that are limited to functions that help provide access and enable execution of operations for a single or local network device in order to operate the radios at that device. In other words, in the multi-link (ML) architecture, MAC SAPs may be virtually established at a single processor for the device, without considering an expanded architecture definition of the MAC SAP.

Examples of the disclosed technology describe defining a split multi-link system that implements a MAC SAP (e.g., as an interface) that can connect the radios from each of the network devices to the backend system, thus serving as a translator between lower layers of IEEE 802.11 (Wi-Fi) and IEEE 802.3 (Ethernet). The MAC SAP may help enable the functionality of an AP in giving corresponding network devices access to the wired network. The use of radios from different network devices may affect data transfer, control, and management operations across the multiple network devices. For example, the split multi-link system can define a physical or virtual multi-link device (MLD), where the MLD operates a first radio from a first AP of a plurality of APs and a second radio from a second AP of the plurality of APs of the MLD. The first radio from the first AP and the second radio from the second AP may operate at different frequencies. The split multi-link system may also affiliate the first radio from the first AP and the second radio from the second AP with the MLD, where, using the MLD, the split multi-link system can transmit one or more data frames from the MLD to a non-MLD client device using the first radio or the second radio.

Various functionalities are implemented in association with the physical or virtual multi-link device (MLD) and the formed Multi-Link Operation (MLO) capable device. For example, control, data, and management functions may be implemented by the MLD. The control functions of the MLD may be local across radios in distinct APs of the plurality of APs which together form the MLO capable device. The data functions of the MLD comprise aggregation, disaggregation, security, or retransmissions. The management functions of the MLD comprise a discovery of Basic Service Set (BSS), association, reassociation, and disassociation functions.

Technical improvements are realized throughout the disclosure. For example, the disclosed technology can provide greater communication coverage with fewer network devices by employing the split multi-link system that shares radios and transmission frequencies affiliated with multiple network devices without the need to install additional network devices that provide additional frequency options. The client device connecting to the split multi-link system may use configuration definitions to connect to the split multi-link system just as the client device would connect to a traditionally-implemented network device (e.g., a traditional AP or switch). This portability may require no configuration changes on the client device side.

Additionally, one or more of these network devices may limit the transmission duration, frequency/occurrence, or other characteristics of the communications with other network devices. The shared MAC SAP of the split multi-link system can be used as an interface to connect the radios to the backend system, which can act like a translator with the lower layers of IEEE 802.11 (Wi-Fi) and IEEE 802.3 (Ethernet). In some examples, the MAC SAP can be used as an interface to select different, non-local network devices with the particular radio frequencies available to transmit the frames to the client device, rather than waiting for the original AP to become available to transmit the frames to the client device.

FIG. 1 illustrates a split multi-link system that defines an MLD in communication with one or more network devices via a network, in accordance with some examples of the disclosure. In this illustration, split multi-link system 100 is provided.

Split multi-link system 100 may be implemented in various logical or physical formats. For example, split multi-link system 100 may be implemented as a separate entity from network devices 120, including a controller, access device, switch, client device, software operating on a local or remote server to a computing network, software-implemented cloud functionality, or other machine-readable entity operable to execute machine-readable instructions to perform the operations described herein. In some examples, split multi-link system 100 can correspond to a multi-link device (MLD), where the MLD operates a first radio from a first AP of a plurality of APs and a second radio from a second AP of the plurality of APs through a Media Access Control (MAC) Service Access Point (SAP) of the MLD, wherein the first radio from the first AP and the second radio from the second AP operate at different frequencies.

Split multi-link system 100 may comprise one or more processors 104, memory 105, and machine readable media 106. Split multi-link system 100 may include, for example, one or more processors 104, controllers, control engines, or other processing devices. Processor 104 may be implemented using a general-purpose or special-purpose processing engine such as, for example, a microprocessor, controller, or other control logic. In the illustrated example, processor 104 is connected to a bus, although any communication medium can be used to facilitate interaction with other components of split multi-link system 100 or to communicate externally.

Split multi-link system 100 may also include one or more various forms of memory 105 or machine readable media 106 to store information and machine-readable instructions. For example, a hard disk drive, a floppy disk drive, a magnetic tape drive, an optical disk drive, a CD or DVD drive (R or RW), or other removable or fixed media drive might be provided. Accordingly, memory 105 might include, for example, a hard disk, a floppy disk, magnetic tape, cartridge, optical disk, a CD or DVD, or other fixed or removable medium that is read by, written to, or accessed by machine readable media 106. As these examples illustrate, machine readable media 106 can include a computer usable storage medium having stored therein computer software or data.

Machine readable media 106 may comprise a plurality of components and engines to enable functionality described throughout the disclosure. For example, machine readable media 106 may include first radio component 108, subsequent radio component 110, MAC SAP component 112, transmission component 114, and multi-link device (MLD) engine 116.

First radio component 108 is configured to identify a first embedded radio with network device 120. For example, first radio component 108 may affiliate the first radio from the first AP and the second radio from the same first AP with a particular network device 120. In another example, first radio component 108 may affiliate the first radio from the first AP and the first radio from the second AP with two different network devices 120.

Various iterations of the radios are available. For example, the first radio from the first AP of the plurality of APs may comprise a first sub-band of 5 GHz and the second AP of the plurality of APs comprises a second sub-band of 5 GHz disjoint from the first sub-band. In another example, the first radio from the first AP of the plurality of APs may comprise a first sub-band of 6 GHz and the second AP of the plurality of APs comprises a second sub-band of 6 GHz disjoint from the first sub-band. Other iterations of the radios and sub-bands may be implemented without diverting from the essence of the disclosure.

Subsequent radio component 110 may also identify a second or subsequent embedded radio with network device 120. For example, subsequent radio component 110 may affiliate the first and second radio (thus the subsequent radio) from a first AP and the first and second radio (thus the subsequent radio) radio from a second AP with two different network devices 120.

In some examples, first radio component 108 and subsequent radio component 110 may be configured to affiliate one or more radios with network devices 120. For example, a radio may be affiliated with a network device when the radio is physically embedded with a physical network device, or when the radio is logically coupled with a virtual network device.

In some examples, first radio component 108 and subsequent radio component 110 may also determine which radios are transmitting or receiving data or otherwise "in use."

Subsequent radio component 110 may also comprise turning off or otherwise deactivating one or more radios at the network device 120. For example, first radio component 108 may identify that a first radio at network device 120 is in use and broadcast an availability to transmit packets to other network devices via a wireless connection in the physical area or a wired connection outside of a physical distance. Subsequent radio component 110 may turn off a second radio at the network device 120 to prevent interference and ensure higher transmission speeds with the first radio that is available. Additionally, when a client device is searching to connect to a particular radio frequency in an area, the network devices 120 can coordinate to ensure that a first radio corresponding with the desired frequency is available from at least one AP an area and other APs that offer the same frequency can be turned off or otherwise deactivated.

MAC SAP component 112, or Media Access Control (MAC) Service Access Point (SAP), may provide an interface for connecting the radios of network devices to the backend system. This interface functionality may include access to control and management functions as a physical or virtual controller of a network device and provide corresponding functionality. For example, the MAC SAP serve as a translator with the network devices and the lower layers of IEEE 802.11 (Wi-Fi) and IEEE 802.3 (Ethernet). MAC SAP component 112 may enable the functionality of an access point to give the network devices access to the wired network.

Transmission component 114 may be configured to, using the split multi-link system 100 operating through the MLD, transmit one or more management, data, and/or control frames between network devices 120. For example, the transmission component 114 can transmit frames from an MLD device (e.g., an AP) to a non-MLD device (e.g., client device) using the first radio or the second radio. In some examples, the client device may be a MLD client device as well.

Transmission component 114 may be configured to determine one or more network devices 120 that are within a communication distance from split multi-link system 100 (e.g., in order to share radio functionality between the network device 120 with the split multi-link system 100). For example, each of the network devices 120 may transmit a discovery message (or operate in a scanning mode) and the subset of network devices that respond may help the network device (that originated the discovery message) determine which network devices are within communication distance of it. That network device may share the mapping of discoverable network devices with split multi-link system 100 to determine which network devices can communicate with each other. In another example, split multi-link system 100 may transmit a discovery message and the network devices 120 that respond may help split multi-link system 100 determine which network devices 120 are within communication distance of it.

In some examples, the management functions of the MLD AP may comprise discovery functions. The discovery functions may comprise the Basic Service Set (BSS), association, reassociation, and disassociation functions.

In some examples, the data functions of the MLD AP may comprise data functions. The data functions may comprise aggregation, disaggregation, security, or retransmissions.

In some examples, transmission component 114 may encrypt one or more transmissions prior to transmitting them via one or more radios embedded with the network device 120. Transmission component 114 may also be configured to decrypt one or more transmissions upon receiving them via one or more radios embedded with the network device.

Multi-link device (MLD) engine 116 is configured to build a MLD by associating a virtual MAC SAP (via the MAC SAP component 112), a first radio from the first network device 120 (via the first radio component 108), and the second radio from the second network device 120 (via the subsequent radio component 110) as components of the MLD. In some examples, MLD engine 116 is configured to build a MLD that has two or more radios, including a 2.4 GHz radio, 5 GHz radio, and 6 GHz radio and the like.

Network device 120 may correspond with a virtual or physical computer device that is configured to transmit and receive frames from other network devices, including split multi-link system 100, via network 130. Illustrative network devices 120 may include a wireless access point (WAP) that communicates with wireless-capable devices via network 130 to allow these devices to connect to a wired network (e.g., a second network different than network 130).

Figure 2:
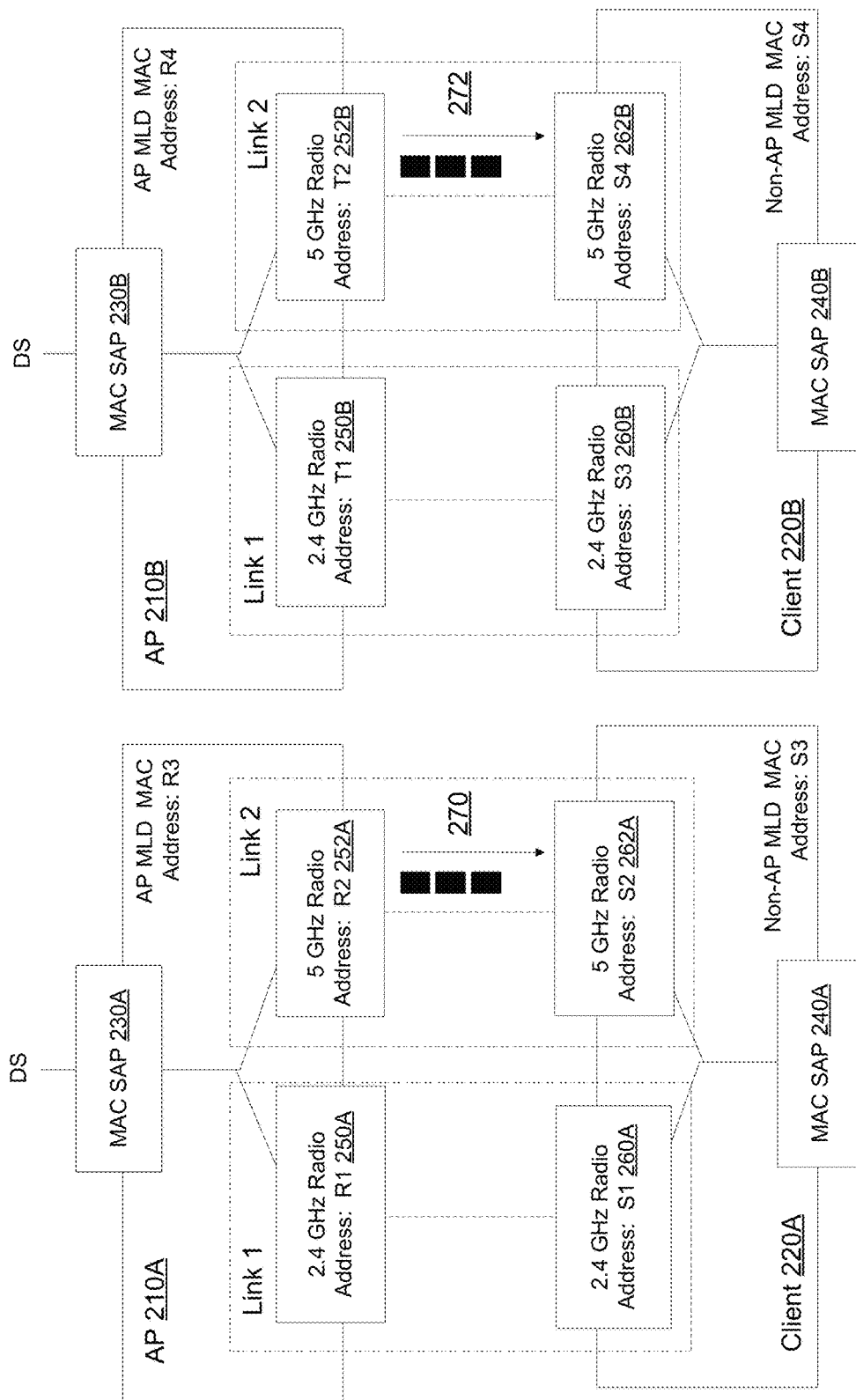
FIG. 2 is an illustrative system with two network devices, each with a MAC SAP, in accordance with some examples of the disclosure.

FIG. 2 is an example system with two network devices, each with a MAC SAP, in accordance with some examples of the disclosure. In this example, two AP network devices 210 (illustrated as first AP 210A and second AP 210B) and two client devices 220 (illustrated as first client device 220A and second client device 220B) are provided. Other network devices besides APs 210 and client devices 220 may be implemented without diverting from the essence of the disclosure, including a switch, router, or other network device.

Each of the network devices 210, 220 comprises a MAC SAP 230, 240 for providing an interface that devices or users can access functionality in the backend system. For example, first AP 210A comprises first AP-based MAC SAP 230A and second AP 220B comprises second AP-based MAC SAP 230B, and first client device 220A comprises a first client-based MAC SAP 240A and second AP 210B comprises second client-based MAC SAP 240B.

Each of the network devices in this illustration comprise at least two radios, including 2.4 GHz and 5 GHz radios, although any radio frequency may be supported by this disclosure. For example, AP network devices 210 include first radio 250 (illustrated as first radio 250A of first AP 210A and first radio 250B of second AP 210B) and first radio 252 (illustrated as second radio 252A of first AP 210A and second radio 252B of second AP 210B), and client devices 220 include first radio 260 (illustrated as first radio 260A of first client device 220A and first radio 260B of second client device 220B) and second radio 262 (illustrated as second radio 262A of first client device 220A and second radio 262B of second client device 220B).

Since first radio 250A of first AP 210A transmits frames on the same frequency as first radio 260A of first client device 220A, these radios may transmit frames on a first link (e.g., upload or download). Similarly, second radio 252A of first AP 210A transmits frames on the same frequency as second radio 262A of first client device 220A, these radios may transmit frames on a second link, first radio 250B of second AP 210B transmits frames on the same frequency as first radio 260B of second client device 220B, these radios may transmit frames on a third link, and second radio 252B of second AP 210B transmits frames on the same frequency as second radio 262B of second client device 220B, these radios may transmit frames on a fourth link.

In this illustration, first AP 210A may transmit one or more data frames 270 in a downlink to first client device 220A. Particularly, first AP 210A may use second radio 252A (operating at 5 GHz) to transmit the data frames to second radio 262A (also operating at 5 GHZ) of first client device 220A. The transmitter address at first AP 210A may correspond with "R2" and the receiver address at first client device 220A may correspond with "S2." Similarly, second AP 210B may transmit one or more data frames 272 in a downlink to second client device 220B, where second AP 210B may use second radio 252B (operating at 5 GHz) to transmit the data frames to second radio 262B (also operating at 5 GHz) of second client device 220B. The transmitter address at second AP 210B may correspond with "T2" and the receiver address at second client device 220B may correspond with "S4."

From a client device 220 perspective, first client device 220A may not determine that the downlink frames are coming from one or two AP devices, since a single AP (e.g., first AP 210A) comprises two radios (e.g., first radio 250A and second radio 252A) operating at two different frequencies. First client device 220A may be capable of receiving the transmissions at two frequencies corresponding with each of the two radios. The wireless communication connection may be initiated with the discovery and connection on the radio basis rather than with the AP device.

From each MAC SAP 230, 240 perspectives, the two radios at each AP are the only locally-accessible radios in these systems.

Figure 3:
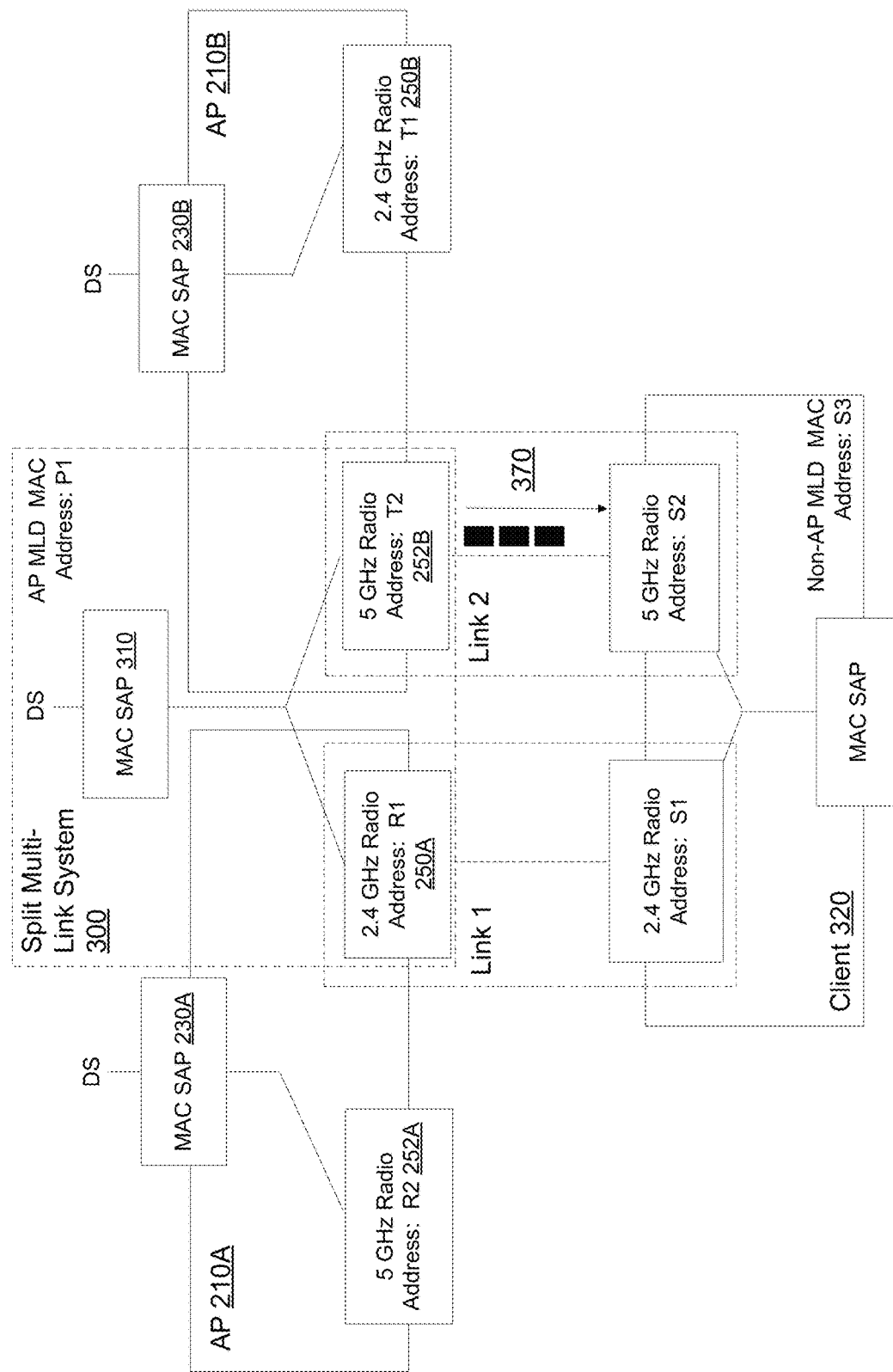
FIG. 3 is an illustrative system with two network devices, each with a MAC SAP, and a split multi-link system, in accordance with some examples of the disclosure.

In another example, a split multi-link system 100 as illustrated in FIG. 1 may be implemented, as illustrated in FIG. 3. As such, FIG. 3 is an illustrative system with two network devices, each with a MAC SAP, and a split multi-link system, in accordance with some examples of the disclosure.

For example, split multi-link system 300 may be implemented at least partially with a system from FIG. 2. Split multi-link system 300 may also initiate a new MAC SAP 310 as an interface for one or more network devices. The system may also define a multi-link device (MLD) that can wirelessly communicate with more than one radio at different network devices 210, including the second radio at the first AP 210A and the first radio at the second AP 210B as illustrated in FIG. 2. These radios may be selected from different APs based on the different frequencies that each radio transmits. For example, the second radio at first AP 210A may correspond with a 2.4 GHz radio and the first radio at second AP 210B may correspond with a 5 GHz radio. When new MAC SAP 310 of split multi-link system 300 provides an interface that can connect the radios from each of network devices 210 to the backend system, thus serving as a translator between lower layers of IEEE 802.11 (Wi-Fi) and IEEE 802.3 (Ethernet). The new MAC SAP 310 may help enable access by the APs 210A and 210B to the wired network, which utilizes and affiliates itself with the radios from pre-existing network devices 210.

In some examples, first AP-based MAC SAP 230A and second AP-based MAC SAP 230B are not implemented and only the new MAC SAP 310 may be implemented to define the split multi-link system 300. The new MAC SAP 310 may perform similar functions that the first AP-based MAC SAP 230A and second AP-based MAC SAP 230B performed, but absent the limitation that the radios be local to the physical network devices 210.

Using these radios available from the first AP and the second AP, MAC SAP 310 of split multi-link system 300, using its interface functionality, may enable transmission of one or more data frames from the MLD (e.g., first AP 210A) to a non-MLD (e.g., client device 320) using the second radio of the first AP 210A (e.g. using sender radio address "R2" to receiver address "S1") or the first radio of the second AP 210B (e.g. using sender radio address "T1" to receiver address "S2"). As illustrated, data frames 370 are transmitted via first radio of second AP 210B to second radio of client device 320, both of which are multi-link devices that utilize their own embedded radios (e.g. using sender radio address "T1" to receiver address "S2"). In this illustration, the multi-link devices operate on both sides of the transmission path, including one network device operating in an AP role and the other network device operating in a client role.

Figure 4:
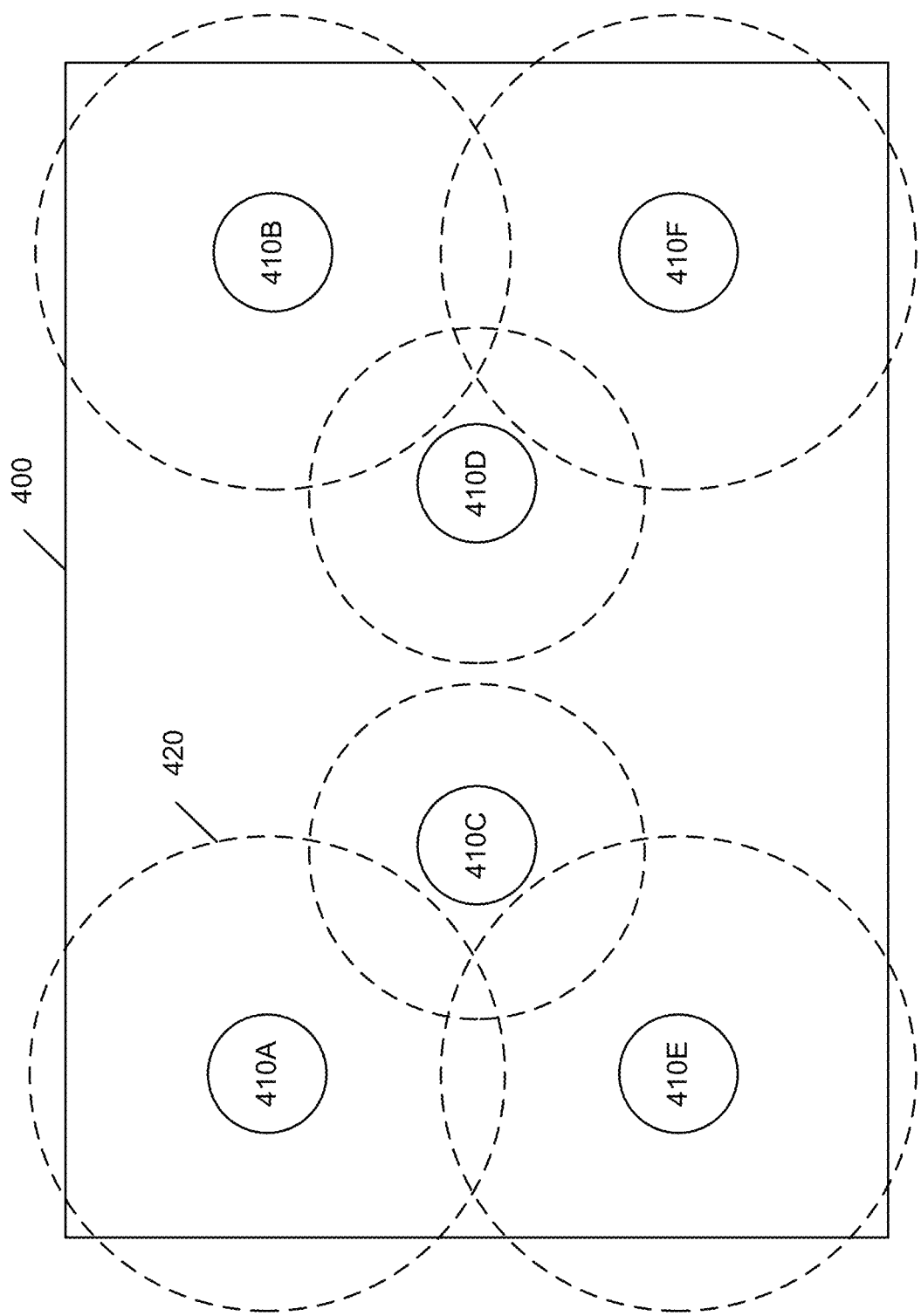
FIG. 4 is an environment with a plurality of network devices, in accordance with some examples of the disclosure.

FIG. 4 is an environment with a plurality of network devices, in accordance with some examples of the disclosure. In this illustration, a plurality of MLDs may be installed in a physical environment 400, including first AP 410A, second AP 410B, third AP 410C, fourth AP 410D, fifth AP 410E, and sixth AP 410F. The plurality of MLDs may each comprise two or more radios operating at different frequencies, as illustrated in APs 210 in FIG. 2-3. As discussed, the MLDs may be physical or virtual devices that are logically located in the particular areas of the environment 400 to offer communication connections via particular radio frequencies affiliated with each MLD.

The transmitting distance 420 may be estimated around each AP 410, such that wireless communication connection initiated by a client device within the transmitting distance 420 may initiate the wireless communication connection with one AP 410 at a time. Multiple client devices may be supported based on the implementation of the AP 410. When the client device attempts to initiate a wireless communication connection outside of this transmitting distance 420, the area may be covered by no APs, as shown in the center top and bottom portions of the illustration.

Figure 5:
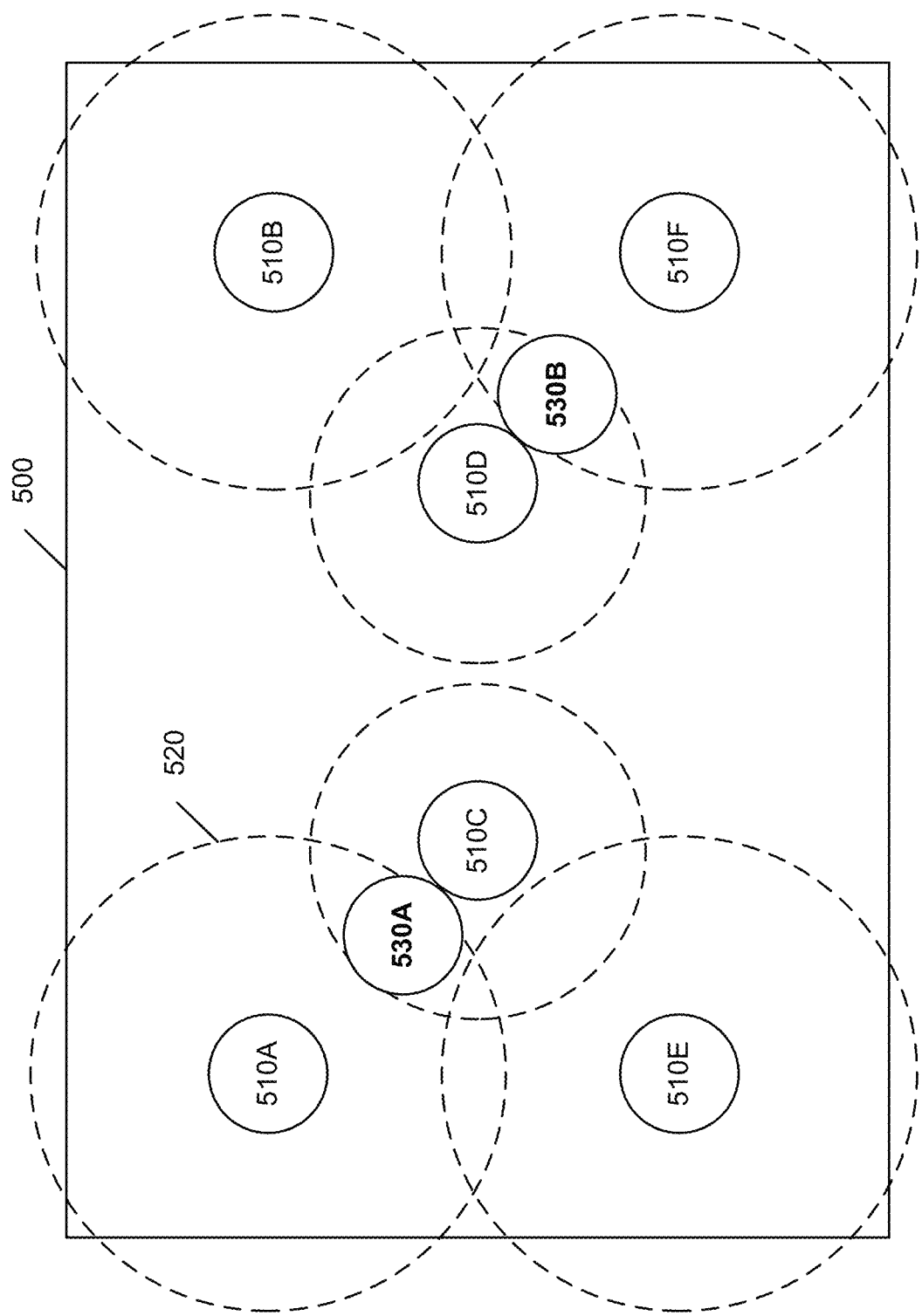
FIG. 5 is an environment with a plurality of network devices with the split multi-link system, in accordance with some examples of the disclosure.

FIG. 5 is an environment with a plurality of network devices with the split multi-link system, in accordance with some examples of the disclosure. In this illustration, a plurality of MLDs 510 may be installed in a physical environment 500, including first AP 510A, second AP 510B, third AP 510C, fourth AP 510D, fifth AP 510E, and sixth AP 510F, as well as transmitting distances 520. The physical environment 500, plurality of MLDs 510, and transmitting distances 520 may be similar to the illustrative examples of the physical environment 400, plurality of MLDs 410, and transmitting distances 420 described with FIG. 4, respectively. As discussed, the MLDs may be physical or virtual devices that are logically located in the particular areas of the environment 500 to offer communication connections via particular radio frequencies affiliated with each MLD.

This illustration also provides a plurality of split multi-link systems 530, illustrated as first split multi-link system 530A and second split multi-link system 530B. The plurality of split multi-link systems 530 may be placed throughout the physical environment 500 and communicate with different radios implemented at the MLDs 510. For example, first split multi-link system 530A may wirelessly communicate on a frequency shared with a first radio at first AP 510A and a second radio at third AP 510C, and second split multi-link system 530B may wirelessly communicate on a frequency shared with a first radio with fourth AP 510D and a second radio with sixth AP 510F.

In other words, each split multi-link system 530 may create a split multi-link system 100 of FIG. 1 (e.g., via a shared MAC SAP) using the 2.4 GHz radio/chipset on a first MLD and the 5 GHz radio/chipset on a second MLD. This setup can logically create a multi-link network device that the client device can affiliate with the other network devices that are already in the environment 500, without requiring the client device to affiliate directly with the multi-link network device implemented by each split multi-link system 530.

Figure 6:
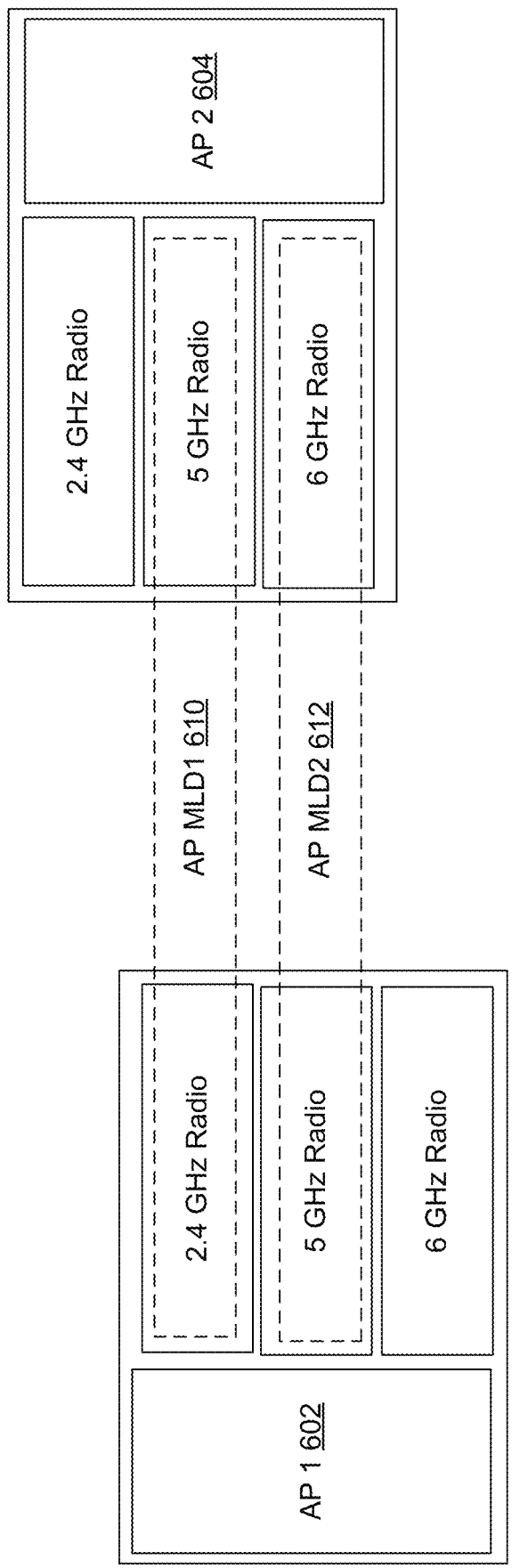
FIG. 6 is an environment with a plurality of network devices with the split multi-link system, in accordance with some examples of the disclosure.

FIG. 6 is an environment with a plurality of network devices with the split multi-link system, in accordance with some examples of the disclosure. In this example, two MLDs, MLD1 610 and MLD2 612, may be formed with two hardware-based APs 602, 604 without any radio in common. As illustrated, MLD1 610 may be formed with a 2.4 GHz radio from AP1 602 and a 5 GHz radio from AP2 604 and MLD2 612 may be formed with a 5 GHz radio from AP1 602 and a 6 GHz radio from AP2 604. In other examples, MLD1 610 and MLD2 612 may each have a 2.4 GHz radio/chipset on MLD1 610 and the GHz radio/chipset on MLD2 612, or other radios/chipsets on other MLDs. The split multi-link system may non-exclusively affiliate a first radio from AP1 602 and a second radio from AP2 604 with MLD1 610 or MLD2 612. Applicable radios may be 2.4 GHz, 5 GHz, 6 GHz, or another frequency for the one or more radios. This non-exclusive affiliation may allow the system to transmit or receive one or more management, data, or control frames in accordance with other examples described herein.

Figure 7:
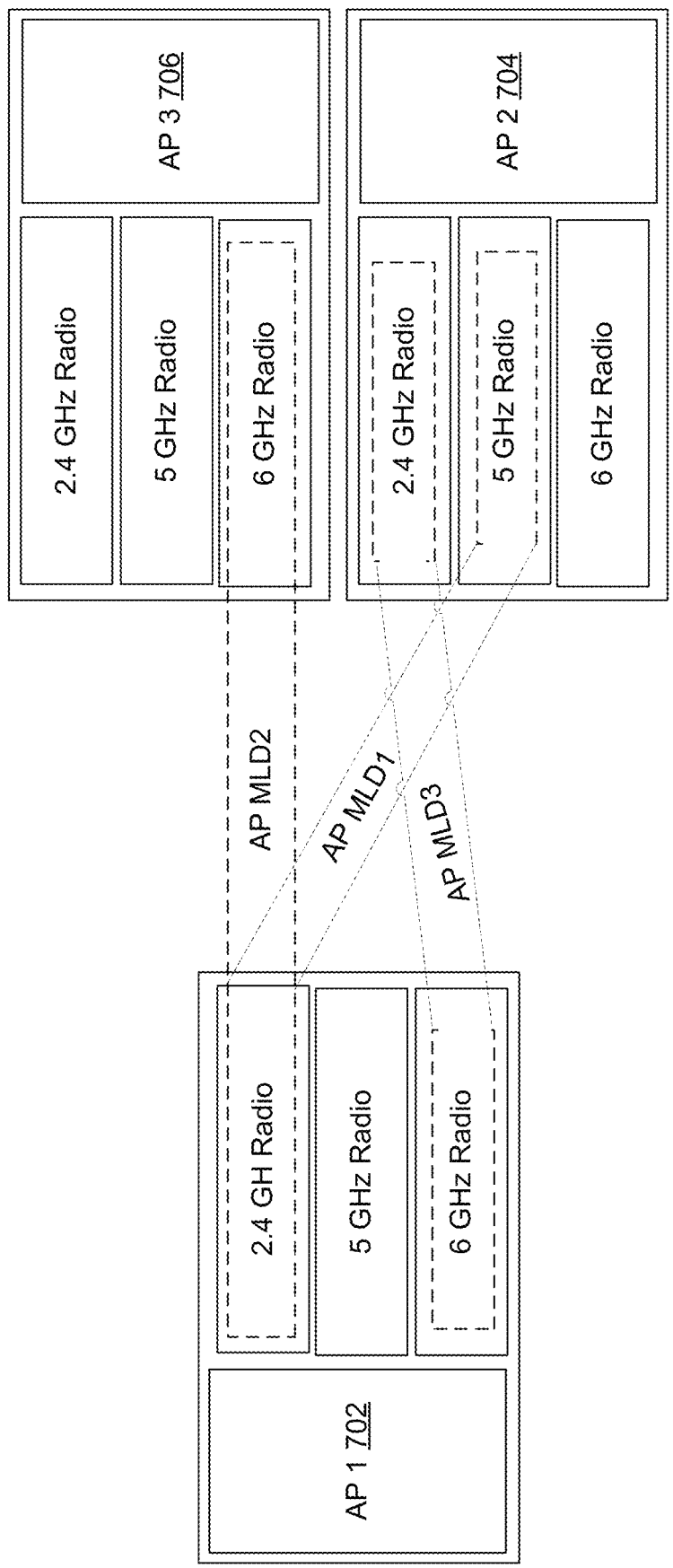
FIG. 7 is an environment with a plurality of network devices with the split multi-link system, in accordance with some examples of the disclosure.

FIG. 7 is an environment with a plurality of network devices with the split multi-link system, in accordance with some examples of the disclosure. In this example, three MLDs may be formed with three hardware-based APs with a subset of radios in common. As illustrated in FIGS. 7, AP1 702, AP2 704, and AP3 706 may have common radios/chipsets, including 2.4 GHz, 5 GHz, 6 GHz, or another frequency. The split multi-link system may affiliate MLD1 with the 2.4 GHz radio/chipset from AP1 702 with the 5 GHz radio/chipset from AP2 704. The split multi-link system may affiliate MLD2 with the 2.4 GHz radio/chipset from AP1 702 with the 6 GHz radio/chipset from AP3 706. The split multi-link system may affiliate MLD3 with the 6 GHz radio/chipset from AP1 702 with the 2.4 GHz radio/chipset from AP2 704. As mentioned above, applicable radios may be 2.4 GHz, 5 GHz, 6 GHz, or another frequency for the one or more radios. In accordance with other examples, these affiliations may allow the system to transmit or receive one or more management, data, or control frames in accordance with other examples described herein.

It should be noted that the terms "optimize," "optimal" and the like as used herein can be used to mean making or achieving performance as effective or perfect as possible. However, as one of ordinary skill in the art reading this document will recognize, perfection cannot always be achieved. Accordingly, these terms can also encompass making or achieving performance as good or effective as possible or practical under the given circumstances, or making or achieving performance better than that which can be achieved with other settings or parameters.

Figure 8:
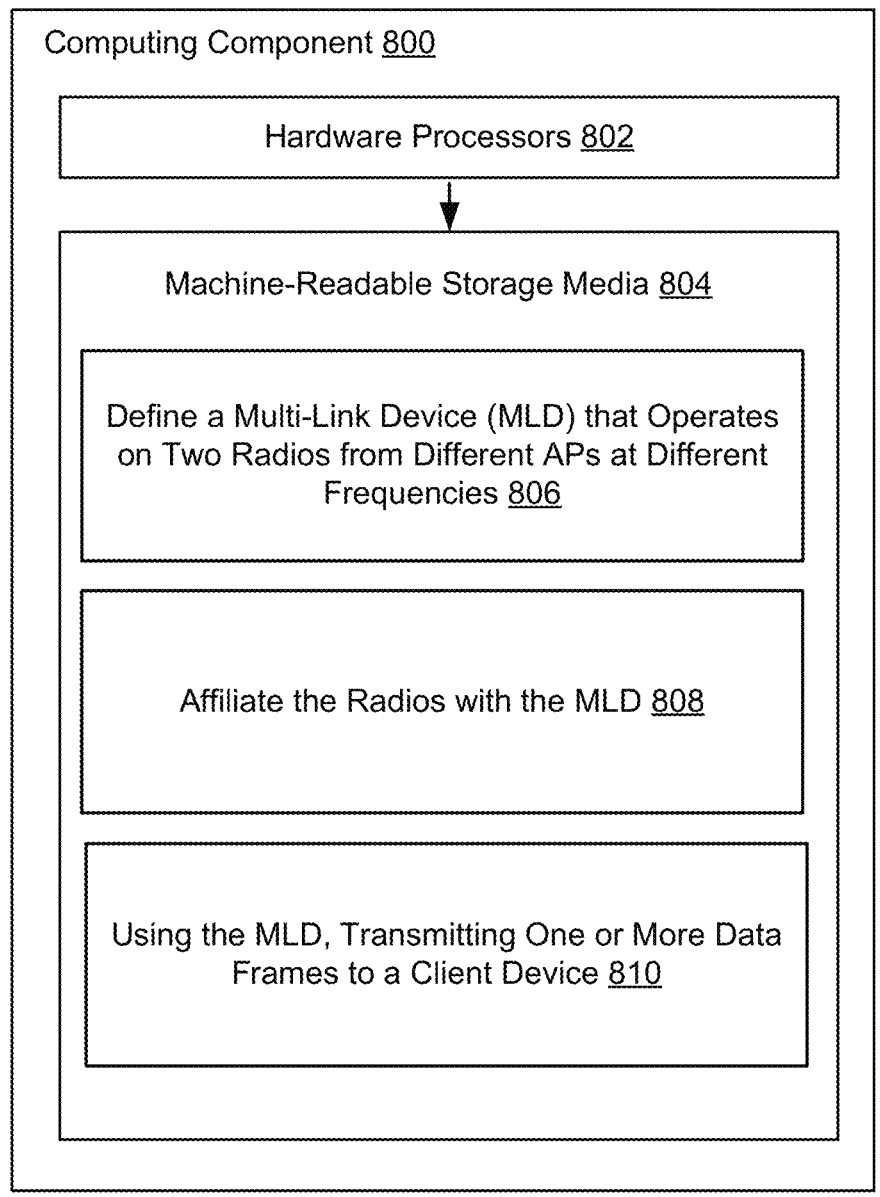
FIG. 8 is an example computing component that may be used to implement various features of embodiments described in the present disclosure.

FIG. 8 illustrates an example computing component that may be used to implement the dynamically modular and customizable computing systems in accordance with various embodiments. Referring now to FIG. 8, computing component 800 may be, for example, a server computer, a controller, or any other similar computing component capable of processing data. In the example implementation of FIG. 8, the computing component 800 includes a hardware processor 802, and machine-readable storage medium for 804.

Hardware processor 802 may be one or more central processing units (CPUs), semiconductor-based microprocessors, and/or other hardware devices suitable for retrieval and execution of instructions stored in machine-readable storage medium 804. Hardware processor 802 may fetch, decode, and execute instructions, such as instructions 806-810, to control processes or operations for implementing the dynamically modular and customizable computing systems. As an alternative or in addition to retrieving and executing instructions, hardware processor 802 may include one or more electronic circuits that include electronic components for performing the functionality of one or more instructions, such as a field programmable gate array (FPGA), application specific integrated circuit (ASIC), or other electronic circuits.

A machine-readable storage medium, such as machine-readable storage medium 804, may be any electronic, magnetic, optical, or other physical storage device that contains or stores executable instructions. Thus, machine-readable storage medium 804 may be, for example, Random Access Memory (RAM), non-volatile RAM (NVRAM), an Electrically Erasable Programmable Read-Only Memory (EEPROM), a storage device, an optical disc, and the like. In some embodiments, machine-readable storage medium 804 may be a non-transitory storage medium, where the term "non-transitory" does not encompass transitory propagating signals. As described in detail below, machine-readable storage medium 804 may be encoded with executable instructions, for example, instructions 806-810.

Hardware processor 802 may execute instruction 806 to define a multi-link device (MLD). In some examples, the MLD operates a first radio from a first access point (AP) of a plurality of APs and a second radio from a second AP of the plurality of APs through a Media Access Control (MAC) Service Access Point (SAP) of the MLD. In some examples, the first radio from the first AP and the second radio from the second AP operate at different frequencies. These radios may be selected from different APs based on the different frequencies that each radio transmits. As described herein, a first radio at a first AP may correspond with a 2.4 GHz radio and the second radio at a second AP may correspond with a 5 GHz radio. The MAC SAP may help enable access by the APs to the wired network, which utilizes and affiliates itself with the radios from pre-existing network devices.

Hardware processor 802 may execute instruction 808 to affiliate the first radio from the first AP and the second radio from the second AP with the MLD. This affiliation may be accomplished with two different network devices (e.g., network device 120 in FIG. 1). As described herein, various iterations of the radios are available. For example, the first radio from the first AP of the plurality of APs may comprise a first sub-band of 5 GHz and the second AP of the plurality of APs comprises a second sub-band of 5 GHz disjoint from the first sub-band. In another example, the first radio from the first AP of the plurality of APs may comprise a first sub-band of 6 GHz and the second AP of the plurality of APs comprises a second sub-band of 6 GHz disjoint from the first sub-band. Other iterations of the radios and sub-bands may be implemented.

Hardware processor 802 may execute instruction 810 to using the MLD, transmit the one or more management, data, or control frames from the AP MLD to a MLD client device using the first radio or the second radio. The transmissions may be encrypted and subsequently decrypted upon receipt via one of the radios. As described herein, a transmissions component may be configured to determine one or more network devices that are within a communication distance from the split multi-link system. This may include transmitting a discovery message (or operating in a scanning mode) and the subset of network devices that respond may help the network device (that originated the discovery message) determine which network devices are within communication distance of it. In some examples, the management functions of the MLD AP may comprise discovery functions. The discovery functions may comprise the Basic Service Set (BSS), association, reassociation, and disassociation functions. Similarly, in some examples, the data functions of the MLD AP may comprise data functions. The data functions may comprise aggregation, disaggregation, security, or retransmissions.

Figure 9:
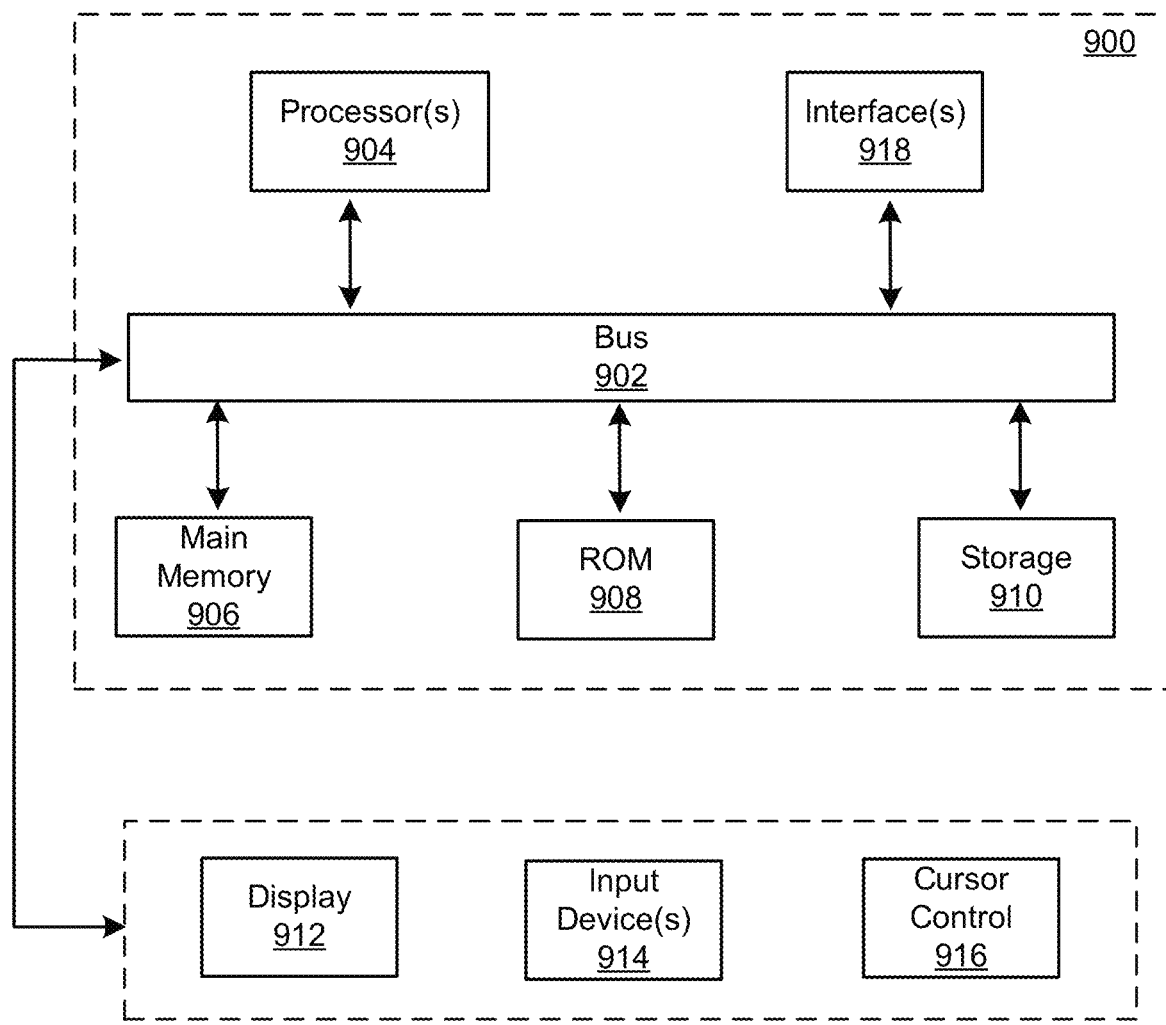
FIG. 9 depicts a block diagram of an example computer system in which various of the embodiments described herein may be implemented.

FIG. 9 depicts a block diagram of an example computer system 900 in which various of the embodiments described herein may be implemented. The computer system 900 includes a bus 902 or other communication mechanism for communicating information, one or more hardware processors 904 coupled with bus 902 for processing information. Hardware processor(s) 904 may be, for example, one or more general purpose microprocessors.

The computer system 900 also includes a main memory 906, such as a random access memory (RAM), cache and/or other dynamic storage devices, coupled to bus 902 for storing information and instructions to be executed by processor 904. Main memory 906 also may be used for storing temporary variables or other intermediate information during execution of instructions to be executed by processor 904. Such instructions, when stored in storage media accessible to processor 904, render computer system 900 into a special-purpose machine that is customized to perform the operations specified in the instructions.

The computer system 900 further includes a read only memory (ROM) 908 or other static storage device coupled to bus 902 for storing static information and instructions for processor 904. A storage device 910, such as a magnetic disk, optical disk, or USB thumb drive (Flash drive), etc., is provided and coupled to bus 902 for storing information and instructions.

The computer system 900 may be coupled via bus 902 to a display 912, such as a liquid crystal display (LCD) (or touch screen), for displaying information to a computer user. An input device 914, including alphanumeric and other keys, is coupled to bus 902 for communicating information and command selections to processor 904. Another type of user input device is cursor control 916, such as a mouse, a trackball, or cursor direction keys for communicating direction information and command selections to processor 904 and for controlling cursor movement on display 912. In some embodiments, the same direction information and command selections as cursor control may be implemented via receiving touches on a touch screen without a cursor.

The computing system 900 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "component," "engine," "system," "database," data store," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computer system 900 may implement the techniques described herein using customized hard-wired logic, one or more ASICs or FPGAs, firmware and/or program logic which in combination with the computer system causes or programs computer system 900 to be a special-purpose machine. According to one embodiment, the techniques herein are performed by computer system 900 in response to processor(s) 904 executing one or more sequences of one or more instructions contained in main memory 906. Such instructions may be read into main memory 906 from another storage medium, such as storage device 910. Execution of the sequences of instructions contained in main memory 906 causes processor(s) 904 to perform the process steps described herein. In alternative embodiments, hardwired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 910. Volatile media includes dynamic memory, such as main memory 906. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 902. Transmission media can also take the form of acoustic or light waves, such as those generated during radio-wave and infra-red data communications.

The computer system 900 also includes a communication interface 918 coupled to bus 902. Communication interface 918 provides a two-way data communication coupling to one or more network links that are connected to one or more local networks. For example, communication interface 918 may be an integrated services digital network (ISDN) card, cable modem, satellite modem, or a modem to provide a data communication connection to a corresponding type of telephone line. As another example, communication interface 918 may be a local area network (LAN) card to provide a data communication connection to a compatible LAN (or WAN component to communicated with a WAN). Wireless links may also be implemented. In any such implementation, communication interface 918 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet." Local network and Internet both use electrical, electromagnetic or optical signals that carry digital data streams. The signals through the various networks and the signals on network link and through communication interface 918, which carry the digital data to and from computer system 900, are example forms of transmission media.

The computer system 900 can send messages and receive data, including program code, through the network(s), network link and communication interface 918. In the Internet example, a server might transmit a requested code for an application program through the Internet, the ISP, the local network and the communication interface 918.

The received code may be executed by processor 904 as it is received, and/or stored in storage device 910, or other non-volatile storage for later execution.

Each of the processes, methods, and algorithms described in the preceding sections may be embodied in, and fully or partially automated by, code components executed by one or more computer systems or computer processors comprising computer hardware. The one or more computer systems or computer processors may also operate to support performance of the relevant operations in a "cloud computing" environment or as a "software as a service" (SaaS). The processes and algorithms may be implemented partially or wholly in application-specific circuitry. The various features and processes described above may be used independently of one another, or may be combined in various ways. Different combinations and sub-combinations are intended to fall within the scope of this disclosure, and certain method or process blocks may be omitted in some implementations. The methods and processes described herein are also not limited to any particular sequence, and the blocks or states relating thereto can be performed in other sequences that are appropriate, or may be performed in parallel, or in some other manner. Blocks or states may be added to or removed from the disclosed example embodiments. The performance of certain of the operations or processes may be distributed among computer systems or computers processors, not only residing within a single machine, but deployed across a number of machines.

As used herein, a circuit might be implemented utilizing any form of hardware, software, or a combination thereof. For example, one or more processors, controllers, ASICs, PLAs, PALs, CPLDs, FPGAs, logical components, software routines or other mechanisms might be implemented to make up a circuit. In implementation, the various circuits described herein might be implemented as discrete circuits or the functions and features described can be shared in part or in total among one or more circuits. Even though various features or elements of functionality may be individually described or claimed as separate circuits, these features and functionality can be shared among one or more common circuits, and such description shall not require or imply that separate circuits are required to implement such features or functionality. Where a circuit is implemented in whole or in part using software, such software can be implemented to operate with a computing or processing system capable of carrying out the functionality described with respect thereto, such as computer system 900.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey those certain embodiments include, while other embodiments do not include, certain features, elements and/or steps.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

What is claimed is:

1. A split multi-link system, comprising:
a memory; and
one or more processors that are configured to execute machine readable instructions stored in the memory to:
define a first multi-link device (MLD) and a second MLD associated with the split multi-link system,
wherein the first MLD operates a first radio from a first access point (AP) of a plurality of APs and a second radio from a second AP of the plurality of APs through a Media Access Control (MAC) Service Access Point (SAP) of the first MLD,
wherein the second MLD operates a third radio from the first AP and a fourth radio from the second AP through a MAC SAP of the second MLD,
wherein the first radio from the first AP and the second radio from the second AP operate at different frequencies, and
wherein the third radio from the first AP and the fourth radio from the second AP operate at different frequencies;
using the first MLD, transmit or receive one or more management, data, or control frames to a first MLD client device; and
using the second MLD, transmit or receive one or more management, data, or control frames to a second MLD client device.

2. The split multi-link system of claim 1, further comprising:
the plurality of APs, wherein each of the plurality of APs comprise two or more radios operating at different frequencies.

3. The split multi-link system of claim 1, wherein the first radio from the first AP of the plurality of APs comprises a 2.4 GHz radio and the second AP of the plurality of APs does not operate the 2.4 GHz radio.

4. The split multi-link system of claim 1, wherein the first radio from the first AP of the plurality of APs comprises a 5 GHz radio and the second AP of the plurality of APs does not operate the 5 GHz radio.

5. The split multi-link system of claim 1, wherein the first radio from the first AP of the plurality of APs comprises a 6 GHz radio and the second AP of the plurality of APs does not operate the 6 GHz radio.

6. The split multi-link system of claim 1, wherein the first radio from the first AP of the plurality of APs comprises a first sub-band and the second AP of the plurality of APs comprises a second sub-band disjoint from the first sub-band.

7. The split multi-link system of claim 1, wherein control functions of the MLD are local across radios in distinct APs of the plurality of APs which together form a single Multi-Link Operation (MLO) capable device.

8. The split multi-link system of claim 7, wherein the MLO capable device is the MLD.

9. The split multi-link system of claim 1, wherein data functions of the MLD comprise aggregation, disaggregation, security, or retransmissions.

10. The split multi-link system of claim 1, wherein management functions of the MLD comprise a discovery of Basic Service Set (BSS), association, reassociation, and disassociation functions.

11. A method comprising:
defining, by a split multi-link system, a first multi-link device (MLD) and a second MLD associated with the split multi-link system,
wherein the first MLD operates a first radio from a first access point (AP) of a plurality of APs and a second radio from a second AP of the plurality of APs through a Media Access Control (MAC) Service Access Point (SAP) of the first MLD,
wherein the second MLD operates a third radio from the first AP and a fourth radio from the second AP through a MAC SAP of the second MLD,
wherein the first radio from the first AP and the second radio from the second AP operate at different frequencies, and
wherein the third radio from the first AP and the fourth radio from the second AP operate at different frequencies;
using the first MLD, transmitting or receiving, by the split multi-link system, one or more data frames to a first MLD client device; and
using the second MLD, transmitting or receiving one or more management, data, or control frames to a second MLD client device.

12. The method of claim 11, wherein the first radio from the first AP of the plurality of APs comprises a first sub-band of 5 GHz and the second AP of the plurality of APs comprises a second sub-band of 5 GHz disjoint from the first sub-band.

13. The method of claim 11, wherein control functions of the MLD are local across radios in distinct APs of the plurality of APs which together form a single Multi-Link Operation (MLO) capable device.

14. The method of claim 11, wherein data functions of the MLD comprise aggregation, disaggregation, security, or retransmissions.

15. The method of claim 11, wherein management functions of the first MLD and the second MLD comprise a discovery of Basic Service Set (BSS), association, reassociation, and disassociation functions.

16. A non-transitory machine-readable medium, storing instructions that when executed, cause a processer to:
define a first multi-link device (MLD) and a second MLD,
wherein the first MLD operates a first radio from a first access point (AP) of a plurality of APs and a second radio from a second AP of the plurality of APs through a Media Access Control (MAC) Service Access Point (SAP) of the first MLD,
wherein the second MLD operates a third radio from the first AP and a fourth radio from the second AP through a MAC SAP of the second MLD,
wherein the first radio from the first AP and the second radio from the second AP operate at different frequencies,
wherein the third radio from the first AP and the fourth radio from the second AP operate at different frequencies,
wherein control functions of the first MLD are local across radios in distinct APs of the plurality of APs which together form a first Multi-Link Operation (MLO) capable device, and wherein control functions of the second MLD are local across radios in distinct APs of the plurality of APs which together form a second MLO capable device;

using the first MLO, transmit or receive one or more management, data, or control frames to a first MLO client device; and using the second MLO, transmit or receive one or more management, data, or control frames to a second MLO client device.

17. The non-transitory machine-readable medium of claim 16, wherein each of the plurality of APs comprise two or more radios operating at different frequencies.

18. The non-transitory machine-readable medium of claim 16, wherein the first radio from the first AP of the plurality of APs comprises a 2.4 GHz radio and the second AP of the plurality of APs does not operate the 2.4 GHz radio.

19. The non-transitory machine-readable medium of claim 16, wherein the first radio from the first AP of the plurality of APs comprises a 5 GHz radio and the second AP of the plurality of APs does not operate the 5 GHz radio.

20. The non-transitory machine-readable medium of claim 16, wherein the first radio from the first AP of the plurality of APs comprises a 6 GHz radio and the second AP of the plurality of APs does not operate the 6 GHz radio.

* * * * *